US005952405A

United States Patent [19]
Schoenberg et al.

[11] Patent Number: 5,952,405
[45] Date of Patent: Sep. 14, 1999

[54] LACTIDE GRAFT COPOLYMERS AND HOT MELT ADHESIVES PREPARED FROM SAME

[75] Inventors: Jules E. Schoenberg, Plano, Tex.;
Robert D. Harlan, Somerville, N.J.;
Stephen F. Hatfield, Lewisville, Tex.;
Johnson K. Samuel, Fords, N.J.

[73] Assignee: National Starch and Chemical Investment Holding Corporation, Wilmington, Del.

[21] Appl. No.: 08/918,878

[22] Filed: Aug. 26, 1997

[51] Int. Cl.$^6$ .................... C08G 63/08; C08G 61/04
[52] U.S. Cl. .................... 524/81; 525/206; 526/320
[58] Field of Search .................... 526/319, 341, 526/320; 525/206; 524/81

[56] References Cited

U.S. PATENT DOCUMENTS

| | | |
|---|---|---|
| 3,442,871 | 5/1969 | Schmitt et al. . |
| 3,700,643 | 10/1972 | Smith et al. . |
| 3,996,309 | 12/1976 | Dowbenko et al. . |
| 4,023,826 | 5/1977 | Kokubo et al. .................... 280/747 |
| 4,073,776 | 2/1978 | Galkiewicz et al. . |
| 4,242,243 | 12/1980 | Antonelli et al. .................... 428/334 |
| 4,626,310 | 12/1986 | Ritter .................... 156/155 |
| 4,741,956 | 5/1988 | Thaler et al. .................... 428/334 |
| 4,921,921 | 5/1990 | Ritter .................... 526/195 |
| 5,194,501 | 3/1993 | Babu et al. .................... 525/103 |
| 5,252,646 | 10/1993 | Iovine et al. .................... 524/270 |
| 5,312,850 | 5/1994 | Iovine et al. .................... 524/47 |
| 5,349,045 | 9/1994 | Jiang .................... 528/323 |
| 5,852,117 | 12/1998 | Schoenberg et al. .................... 525/67 |
| 5,869,598 | 2/1999 | Yoshida et al. .................... 528/364 |
| 5,879,713 | 3/1999 | Roth et al. .................... 428/489 |

FOREIGN PATENT DOCUMENTS

| | | |
|---|---|---|
| 0 768 329 A2 | 4/1997 | European Pat. Off. . |
| 2124853 | 9/1972 | France . |
| 755661 | 8/1956 | United Kingdom . |

OTHER PUBLICATIONS

Barakat et al. Caplus an 1994:558629. 1994.
Hawker et al., Macromol. Chem. Phys., 198, 155–166 (1997).
F. Chabot et al., Configurational structures of lactic acid stereocopolymers as determining by$^{13}$C–$\{^1\}$ n.m.r., *Polymer*, 1983, vol. 24, Jan., pp. 53–58.
Thomas A. Lukenbach, "Dynamic mechanical rheological testing: a versatile tool for the elastomer lab", *Elastomerics*, Mar. 1991, pp. 13–17.
I. Barakat et al., Macromolecular Engineering of Polylactones and Polylactides. X. Selective End–Functionalization of Poly(D,L)–Lactide, *Journal of Polymer Science: Part A: Polymer Chemistry*, vol.31, (1993) pp. 505–514.
Z Jedlinski et al., "Synthesis of ethylene glycol–L–lactide block copolymers", *Makromol. Chem.* 194 (1993) pp. 1681–1689.
I. Barakat et al., "Macromolecular Engineering of Polylactones and Polylactides. XV. Poly(D,L)–lactide Macromonomers as Precursors of Biocompatible Graft Copolymers and Bioerodible Gels", *Journal of Polymer Science: Part A: Polymer Chemistry*, vol. 32, (1994) pp. 2099–2110.
J. Eguiburu et al., "Functionalization of poly(L–lactide) macromonomers by ring –opening polymerization of L–lactide initiated with hydroxyethyl methacrylate–aluminum alkoxides", *Polymer*, vol. 36 No. 1 1995, pp. 173–179.

*Primary Examiner*—Jeffrey C. Mullis
*Attorney, Agent, or Firm*—Lydia T. McNally

[57] ABSTRACT

Polylactide or polyglycolide graft copolymers, prepared with grafts comprising up to 40% by total polymer weight, but not 0%, of glycolide or the D- or L-isomer of lactide in an enantiomeric excess of 84% on a saturated polymer backbone, are suitable for use as the thermoplastic elastomeric component of hot melt adhesives.

5 Claims, 4 Drawing Sheets

LACTIDE GRAFT COPOLYMERS AND HOT MELT ADHESIVES PREPARED FROM SAME

FIELD OF THE INVENTION

This invention relates to graft copolymers prepared from lactide and ethylenically unsaturated monomers, more particularly to graft copolymers used as the thermoplastic elastomer in hot melt adhesives, and to pressure sensitive adhesives comprising these graft copolymers.

BACKGROUND OF THE INVENTION

Thermoplastic elastomers are used extensively as the polymeric component of hot melt and pressure sensitive adhesives. These elastomers are multicomponent polymers that contain a hard, semi-crystalline, or nonflexible, phase dispersed in a soft, amorphous, elastomeric phase. The polymers are molten above the glass transition temperature or melt temperature of the hard polymeric phase, and aggregate below these temperatures into domains that behave like physical crosslinks. The elastomeric phase constitutes the larger portion of the polymer and becomes the continuous phase, which gives the composite polymer the flexibility and elongation of a rubber.

Commercially available thermoplastic elastomers generally fall into three types: styrene-elastomer-styrene triblock copolymers, such as, styrene-butadiene-styrene and styrene-isoprene-styrene block copolymers and their corresponding hydrogenated versions; thermoplastic polyurethanes; and thermoplastic segmented polyesters, such as poly (tetramethylene glycol) as the elastomeric component and poly(tetramethylene terephthalate) as the hard component.

These commercially available thermoplastic elastomers have certain drawbacks in chemical and mechanical properties, and they can be difficult to manufacture. The triblock copolymers are made by anionic polymerization, which requires the exclusion of oxygen and moisture; the hard domains are glassy rather than crystalline; the viscosities are high because the polymers are linear and not branched; and the melt (or softening) points are low, which can give inadequate heat resistance or green strength. The polyesters have many of the same problems as the triblock copolymers and are prepared at high temperatures and high vacuum. The polyurethanes are not thermally stable. In addition, many of these polymers are derived from petroleum products and are cost dependent on the pricing of those products; moreover, they are very resistant to degradation.

Processes for making polylactide graft copolymers have been described in the literature. An article by Eguiburu, Berridi and Roman, entitled "Functionalization of poly(L-lactide) macromonomers by ring-opening polymerization of L-lactide initiated with hydroxyethyl methacrylate-aluminum alkoxides," published in POLYMER, volume 36, number 1, pages 173–179 (1995), reported the preparation of acrylic macromonomers of poly(L-lactide) by the ring-opening polymerization of L-lactide, initiated by acrylic functionalized aluminum alkoxides. Specifically, the initiators were mono- and tri-hydroxyethyl methacrylate-aluminum alkoxides. The polymerization was carried out in toluene at 60° C. and yielded methacrylate terminated poly (L-lactide) macromonomers that were reported to be copolymerizable with other vinyl or acrylic monomers to provide graft copolymers.

An article by Barakat, DuBois, Jerome, Teyssie and Goethals, entitled "Macromolecular Engineering of Poly-lactones and Polylactides. XV. Poly(D,L)-lactide Macromonomers as Precursors of Biocompatible Graft Copolymers and Bioerodible Gels", published in The Journal of Polymer Science: Part A:

Polymer Chemistry, Volume 32, pages 2099–2110 (1994), reported the ring-opening polymerization of L-lactide, initiated by acrylic functionalized aluminum alkoxides, in toluene at 70° C. The poly(L-lactide) macromonomer could be synthesized to contain acrylate functionality at either one or both ends of the macromonomer. The acrylate-functionalized macromonomers were then copolymerized with other acrylate comonomers.

These processes suffer from several disadvantages: the acrylate macromonomers are less reactive than the normal acrylate monomers and require more stringent reaction conditions for copolymerization; the higher reaction temperatures needed to prepare the macromonomers can result in uncontrolled polymerization; the aluminum alkoxide initiators give aluminum salt by-products that must be washed from the polylactide/acrylate product; and the functionalized polylactide polymers are soluble only in relatively noxious solvents.

The present invention provides polylactide graft copolymers in which the grafting of the polylactide occurs after the formation of the polymer backbone.

BRIEF DESCRIPTION OF THE DRAWINGS

FIG. 1 is a graph of the RDA of a copolymer prepared from 0.5% by weight of 2-HEA, and 25% by weight of lactide.

FIG. 2 is a graph of the RDA of a copolymer prepared from 0.5% by weight of 2-HEA, and 35% by weight of lactide.

FIG. 3 is a graph of the RDA of a copolymer prepared from 1.0% by weight of 2-HEA, and 35% by weight of lactide.

FIG. 4 is a graph of the RDA of a copolymer prepared from 1.0% by weight of 2-HEA, and 40% by weight of lactide.

SUMMARY OF THE INVENTION

Figure 1:
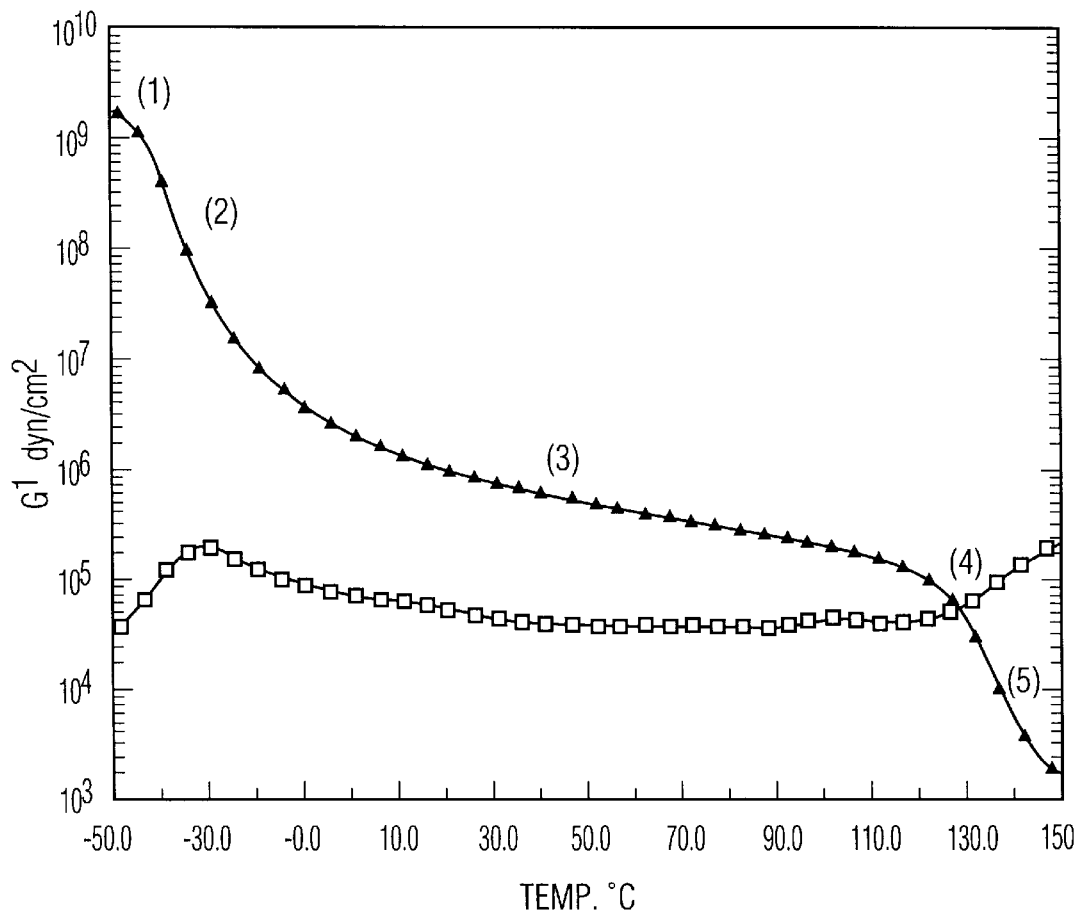
FIGS. 1 to 4 are drawings of the graphs of the rheological dynamic analysis (RDA) of graft copolymers of this invention. Temperature in degrees Celcius is plotted on the X-axis, and G'(dyne/cm$^2$) is plotted on the Y-axis. Each graft copolymer has a backbone prepared from butyl acrylate with varying amounts by weight of 2-hydroxyethyl acrylate (2-HEA), and lactide grafts polymerized onto the backbone from varying amounts of lactide given in weight percent by weight of the total polymer.

This invention is directed to graft copolymers of lactide or glycolide and ethylenically unsaturated monomers. Lactide is the common name for 3,6-dimethyl-1,4-dioxane-2,5-dione; glycolide is the common name for 1,4-dioxane-2,5-dione. The graft copolymers can be particularly described as thermoplastic elastomeric polymers having the structure:

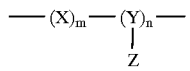

in which X represents the polymer units resulting from the polymerization of one or more monomers (the X monomers) selected from the group consisting of $C_2$–$C_8$ alkyl acrylate, $C_2$–$C_8$ alkyl methacrylate, ethylene and vinyl acetate; Y represents the polymer units resulting from the polymerization with the X monomers of a monomer (the Y monomers)

selected from the group consisting of 2-hydroxyethyl acrylate, 2-hydroxyethyl methacrylate, hydroxypropyl acrylate, hydroxypropyl methacrylate, allyl alcohol, and N-(t-butyl)aminoethyl methacrylate, and will be present in an amount up to about 6%, but not 0%, by weight of the X monomers; Z represents the polymerized lactide or glycolide graft, in which the total amount of the lactide or glycolide is present in an amount up to about 40%, but not 0%, by weight of the total polymer weight; and m and n are integers designating the relative molar amounts of monomer units comprising the backbone chain of the polymer such that the backbone polymer has a number average molecular weight of 10,000–200,000.

In another embodiment, this invention is a thermoplastic hot melt adhesive comprising the polylactide graft copolymer as described.

DETAILED DESCRIPTION OF THE INVENTION

Preferably, the X monomers are butyl acrylate, or are a mixture of butyl acrylate and one or more $C_2$–$C_8$ alkyl acrylates other than butyl acrylate. If a mixture of butyl acrylate and other acrylates is used, preferably the other acrylate will be 2-ethylhexyl acrylate. If a mixture of butyl acrylate and other acrylates is used, preferably the butyl acrylate will be present in an amount of at least 50% by weight of the mixture. In general, however, the X monomers suitable for forming the backbone polymer can be any ethylenically unsaturated monomers, and most typically will be acrylate, methacrylate, ethylene, or vinyl acetate monomers. These monomers will be chosen to provide the desired glass transition temperatures and molecular weights to meet the requirements for the anticipated end-uses. Such variations are within the expertise of those skilled in the art.

The backbone polymer will be prepared via a free radical polymerization as is known in the art using the customary initiators. Preferably, the inators will be an azo or peroxy initiator, and more preferably will be t-butyl peroctoate or t-amyl peroctoate. The initiators will be present in amounts from about 0.05 to 1.0% by weight of the backbone monomers. Typically, the polymerization reaction will be conducted in a solvent, in which case the solvent is preferably chosen so that the lactide monomer and polymer will be soluble in that solvent and unreactive toward the solvent. Common and suitable solvents are toluene, methylene chloride, benzene, xylenes, and cyclohexane, although many others are known and useful for the polymerization of the backbone polymer.

After the backbone polymer is formed, the D- or L-lactide in an amount up to about 40%, but not 0%, by weight of the backbone polymer is added to the polymerization reaction mixture and heated to temperatures in the range of 80°–175° C. in the presence of a transesterification catalyst to both polymerize the lactide or glycolide and graft the lactide or glycolide to the backbone polymer.

One of the potential applications for the graft copolymers of this invention is as thermoplastic elastomeric polymers in hot melt adhesives. In those embodiments, the backbone polymer preferably will have a Tg less than 0° C., and it will be compatible with the lactide or glycolide monomer and resulting grafted polymer at temperatures above the melting point of the lactide or glycolide monomers and grafted polymer.

Thermoplastic elastomers are multicomponent polymers containing a hard, crystalline or semi-crystalline component dispersed in a continuous, elastomeric component. The crystalline or semi-crystalline component aggregates below the melt temperature into physical crosslinks. The continuous, elastomeric component gives the composite the flexibility and elongation of a rubber. Such thermoplastic elastomers are melt-processable above the glass transition temperature (Tg) if the polymer is amorphous, or above the melt temperature (Tm) if the polymer is crystalline or semi-crystalline.

To be suitable for use as thermoplastic elastomers in hot melt adhesives, the graft copolymers of this invention should contain crystalline or semi-crystalline regions dispersed in a continuous, elastomeric region. The crystalline or semi-crystalline regions are provided by the polymerized lactide or glycolide grafts, and the continuous regions are provided by the polymeric backbone.

Lactide contains two equivalent asymmetric carbon atoms, and may exist in either a DD, LL or meso form. The DD and LL forms are enantiomeric and will be referred to hereinafter as the D or L isomers, respectively. The meso form is the trans isomer with a center of symmetry and a D,L configuration. Random lactide polymers prepared from the meso form or from racemic mixtures of the L and D isomers have reduced crystallinity and reduced melting points compared to the polymer formed from pure D or L isomers. Since reduced crystallinity and reduced melting points tend to give low Tg, amorphous polymers, these are of minimal value as the hard component of a thermoplastic elastomer. Consequently, the preferred lactides for use in preparing hot melt adhesives are the L or D isomers, present in a sufficient enantiomeric excess (mole % of major enantiomer minus mole % of minor enantiomer) of the D- or L-lactide isomer, so that if the mixture of isomers is polymerized, the resulting polymer will have a melting point that is 124° C. or greater. For lactide, an enantiomeric excess of 84% gives a crystalline polymer.

This is illustrated by the data in Table 1, which have been previously reported by F. Chabot, M. Vert, S. Chapelle, and P. Granger, in *Polymer* 24, 53 (1983), in which the composition and characteristics of stereocopolymers prepared from mixtures of L-lactide and the racemic mixture (an equal amount of L and D isomers), and their melting points are reported. The data show that at an enantiomeric excess less than 84%, the polymer loses its crystallinity, becomes amorphous, and exhibits a reduction in melting point.

TABLE 1

Lactic Acid Stereocopolymer

| % Lactides in Polymerization Reaction Mixture | | |
|---|---|---|
| L-lactide* | Racemic | melting point (° C.) |
| 100 | — | 173 |
| 96 | 4 | 160 |
| 92 | 8 | 145 |
| 84 | 16 | 124 |
| 75 | 25 | amorphous |
| 50 | 50 | amorphous |
| 25 | 75 | amorphous |
|  | 100 | amorphous |
|  | 100% meso | amorphous |

Note:
*% L-lactide = enantiomeric excess

The resulting graft copolymers have glass transition temperatures near −30° C., and melting points in the range of 90° to 110° C., indicating good phase separation between the amorphous acrylate domain and the crystalline lactide domain.

In order to obtain polylactide in crystalline form, with high Tm values, the catalyst for the transesterification should be one that preserves configuration of the D or L isomer. The catalyst will also be one that is active in the temperature range below the temperature that leads to racemization. The preferred catalysts are tin salts, particularly stannous chloride and stannous 2-ethylhexanoate (commonly known as stannous octoate). Stannous chloride is a highly preferred catalyst due to its high activity, low toxicity, and capability for giving high grafting efficiencies.

These graft copolymers can be designed with variations in the backbone, as well as in the polylactide or polyglycolide chain length and number of chains to provide materials that range from tough thermoplastic elastomers to inherently pressure sensitive polymers. It will be understood from the disclosures in this specification that by increasing the polylactide or polyglycolide content or by decreasing the sites for grafting of the polylactide or polyglycolide, the grafted chains will be longer, and stronger and stiffer materials can be obtained.

An unexpected result of using the polylactide side chains is that an increase in polylactide content also gives a large increase in melt viscosity. This is unexpected because the theoretical increase in molecular weight is relatively small, and branched polymers generally have lower viscosities than linear polymers at equal molecular weights. This is potentially important in end uses where a high viscosity is needed during the application of the molten material to a substrate.

It was also unexpectedly discovered that the addition of a soluble fluoride salt to the polylactide graft copolymer imparted improved stability over time. Suitable salts are those such as tetrabutylammonium fluoride, and are used in any amount effective to control gellation. In general, the salts are effective in amounts at a molar ratio to the tin catalyst at greater than about 20:1.

Hot melt adhesives containing these lactide graft copolymers will comprise 20–100% by weight of the lactide graft copolymer with the remaining portion being other conventional additives, such as plasticizers, tackifiers, and stabilizers. Since the polylactides and polyglycolides are susceptible to hydrolysis, it is important that any additives be very dry. Additives containing primary or secondary amine groups, or any other groups that can react with the polylactide or polyglycolide, are undesirable.

It will be recognized that formulations can be adapted to include a is wide variety of hot melt adhesive compositions, the more precise formulations of which will vary depending upon the specific end use. The knowledge of such formulations is readily available to those skilled in the particular art.

In general, pressure sensitive adhesives can be prepared using, by weight, 20 to 100% of the polylactide or polyglycolide graft copolymer, 0 to 60% of a tackifying resin, 0 to 50% plasticizer and 0 to 3% of a stabilizer. Preferred pressure sensitive adhesives are prepared using 30 to 100% of the polylactide or polyglycolide graft copolymer; 0 to 50% of a tackifying resin, preferably a terpene phenolic resin; and 0 to 30% of a plasticizer, preferably Pycal 94, a phenyl ether of poly(ethylene glycol) from ICI, or Hercolyn D, a methyl ester of hydrogenated rosin from Hercules. Lower levels of plasticizer may also be employed to produce adhesives useful for various end uses, such as in construction adhesives for disposable products where some initial degree of tack is needed but no residual pressure sensitive properties are required.

In general, non-pressure sensitive adhesives can be prepared using 20 to 100% by weight of the polylactide or polyglycolide graft copolymer, 2 to 80% tackifying resin, 0 to 30% of a wax-like diluent, 0 to 30% plasticizer and 0 to 3% of a stabilizer. Preferred non-pressure sensitive adhesives are prepared using 30 to 100% of the polylactide or polyglycolide graft copolymer; 0 to 40% tackifying resin, preferably terpene-phenolic resins or rosin derivatives; 0 to 25% of plasticizer, preferably the phenyl ether of poly (ethylene glycol) or the methyl ester of hydrogenated wood rosin; and 0 to 20% of a wax-like diluent, preferably hydrogenated castor oil (also known as castor wax) or N-(2-hydroxyethyl)-12-hydroxystearamide.

Additionally, polymers other than the graft copolymer may be incorporated into the hot melt adhesives at levels less than about 20% by weight.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins, for example, gum rosin, wood rosin, tall oil rosin, distilled rosin, hydrogenated rosin, dimerized rosin, and polymerized rosin; (2) glycerol and pentaerythritol esters of natural and modified rosins, for example, the glycerol ester of pale wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof, for example, the resin product resulting from the condensation in an acidic medium of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of less compatible resins (less than about 10% of the adhesive) may be utilized for some formulations. While the tackifier may comprise up to about 80% of the adhesive, it is generally used in amount of 10% to 60% by weight.

Depending on the end-use application, and particularly for uses requiring pressure sensitive properties, various compatible plasticizing or extending oils may also be present in the composition. Preferred compatible plasticizers include phthalate plasticizers, such as dioctyl phthalate; liquid polyesters, such as Dynacol 720, available commercially from Huls; benzoate plasticizers, such as 1,4-cyclohexane dimethanol dibenzoate (e.g., Benzoflex 352 available commercially from Velsicol); phosphate (e.g., Santicizer 154 available commercially from Monsanto); poly (ethylene glycols) and its corresponding derivatives, such as the phenyl ether of poly(ethylene glycol) (e.g., Pycal 94 available commercially from ICI); liquid rosin derivatives having Ring and Bell melting points below about 60° C., such as, methyl ester of hydrogenated rosin (e.g., Hercolyn D from Hercules); and vegetable and animal oils, such as, glyceryl esters of fatty acids and their polymerization products.

Other applications conventionally employing adhesives based on these polylactide polymers may require the use of wax diluents in order to reduce the melt viscosity of the hot melt compositions without appreciably decreasing their adhesive bonding characteristics. These waxes are often used in adhesives which do not exhibit pressure sensitive properties.

Suitable waxes include hydrogenated castor oil, oxidized synthetic waxes, poly(ethylene oxide) having a weight average molecular weight above about 1000 and functionalized synthetic waxes such as carbonyl containing Escomer H101 from Exxon. Some adhesive formulations may contain both wax and plasticizer components so that the presence of one or the other is not mutually exclusive.

Among the applicable stabilizers or antioxidants are high molecular weight hindered phenols and multifunctional phenols. Representative hindered phenols include: 1,3,5-trimethyl-2,4,6-tris(3,5-di-tert-butyl-4-hydroxybenzyl) benzene; pentaerythritol tetrakis-((3-(3,5-di-tert-butyl-4-hydroxyphenyl propionate)); n-octadecyl 3-(3,5-di-tert-butyl-4-hydroxyphenyl)propionate; 4,4'-thiobis (6-tert-butyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxy-benzylphosphonate); 2-(n-octylthio)-ethyl 3,5-di-tert-butyl-4-hydroxybenzoate; 2-(n-octylthio) ethyl 3,5-di-tert-butyl4-hydroxybenzoate; and sorbitol hexa(3-(3,5-di-tert-butyl4-hydroxyphenyl)propionate). If used, the stabilizer is present in levels of about 0.1 to 3% by weight.

Optional additives may be incorporated into the hot melt compositions, for example colorants, such as, titanium dioxide; and fillers such as talc and clay, to modify certain properties.

These hot melt adhesive compositions may be formulated using techniques known in the art. An exemplary procedure involves placing approximately 40% of the total tackifying resin concentration with all the polymer, wax, plasticizers and stabilizers in a jacketed mixing kettle preferably equipped with rotors, and raising the temperature until the resin has melted (in the range of about 190° C.), and then lowering the temperature to 150° to 165° C. Mixing and heating are continued until a smooth, homogeneous mass is obtained, at which point the remainder of the tackifying resin is thoroughly and uniformly admixed into the melt.

The adhesives may be employed in a wide variety of applications. The non-pressure sensitive adhesives may be used in bookbinding operations, for laminating tissue and/or screen-reinforced tissue layers, such as in wipes, paper towels, and toilet tissue. When formulated with plasticizers, the adhesives may be used in the assembly or construction of disposable articles, such as sanitary napkins, disposable diapers, hospital gowns, and bed pads, and are particularly useful for the assembly of disposables using multi-line construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrates, for example, to make elongation resistant gathers around the leg openings of diapers or to seal perimeters of diapers.

EXAMPLE 1

Preparation of the Graft Copolymers

Graft copolymers were prepared containing acrylate in the backbone and polylactide in the side chain. The acrylate backbone was prepared in a free radical polymerization from one part by weight 2-hydroxyethyl acrylate (2-HEA) and 99 parts by weight butyl acrylate (BA) or from equal parts butyl acrylate (BA) and 2-ethylhexyl acrylate (2-EHA). L-lactide was then added in various amounts and graft polymerized onto the hydroxyl group of 2-HEA using a tin catalyst at moderate temperatures.

Preparation of an Acrylate Polymeric Backbone. Cyclohexane (300 g) was placed in a one L, roundbottom flask and heated under nitrogen with stirring to a gentle reflux (bp=80° C.). Butyl acrylate (297 g) (or a 50:50 mixture by weight of BA and 2-EHA) and 2-hydroxyethyl acrylate (3 g) were combined in an addition funnel and 80 ml of that mixture was added to the flask. Adding the acrylate increased the reflux temperature to 85° C. One half of a solution containing 1.2 g of the radical initiator t-butyl peroxy(2-ethylhexanoate) in 15 ml of cyclohexane was added to the flask followed by the addition of one ml of the remainder of the initiator solution to the reaction mixture every 30 minutes over a three hour period. The remainder of the acrylate mixture was added dropwise during the same three hour period. After the additions were complete, the reaction mixture was refluxed for another two hours, and was then cooled to room temperature. The product was a polyacrylate lacquer. The extent of polymerization was determined by analysis of solids content.

Preparation of Polylactide Graft. The polyacrylate lacquer (200 g) was added to an oven-dried, 500 ml roundbottom flask. The lacquer was heated to reflux and the temperature was raised to 150° C. by distilling the cyclohexane into a Dean Stark receiver. Dry L-lactide (54 g) was then added. The mixture was stirred for one hour at 150° C., at which point the reaction mixture was clear, indicating the lactide had dissolved. A tin catalyst was added to polymerize and graft the lactide. The disappearance of lactide was monitored by gas chromatography, and in most cases, the reaction was complete after a total of three hours. After the completion of the reaction, Irganox® 1010 antioxidant, a product of Ciba-Geigy, was added and vacuum was pulled at 3 torr and 150° C. to remove volatile materials. The copolymer was poured into a silicon lined box, cooled, and placed in a desiccator. Overall yields were at least 95%.

EXAMPLE 2

Graft Copolymers using 0.02 mole % stannous chloride

Polylactide graft copolymers were prepared as in Example 1 using 0.02 mole % stannous chloride based on lactide as the transesterification catalyst for the grafting of the lactide onto the polymer backbone. The backbone polymer compositions comprise 1 part by weight 2-HEA and 99 parts by weight BA or 1 part by weight 2-HEA and 99 parts by weight of equal weights of BA and 2-EHA. Table 2 gives the backbone composition, the weight percent of lactide added, the grafting efficiency, and the melt viscosity of the final graft copolymer.

The graft copolymers prepared in Example 2 were strong, elastomeric materials similar to vulcanized rubber. Products containing equal amounts of BA and 2-EHA in the backbone were more flexible than the ones containing only BA.

Melt viscosities were measured using a Brookfield Digital Viscometer using #27 spindles at a speed of 10 rpm. Samples were first heated at 375° C. for 30 minutes, cooled to 350° C., and run until the viscosities remained constant.

Determination of L-lactide by gas chromatography was made under the following conditions:

| | |
|---|---|
| Column: | 5m Hewlett Packard series 530m test column 19095-100 |
| Injection Port Temp: | 200° C. |
| Program: | 50° C. to 200° C. at 10° C./min |
| Detector: | Flame Ionization Detector |

-continued

| Sample Conc: | 1 mg/ml |
| Sample Size: | 1 μl |

The Grafting Efficiency was expressed as the percent of the polylactide that was soluble in 25% by volume methylene chloride in 75% cyclohexane according to the following method: A sample of polymer (3 g) dissolved in 15 ml of methylene chloride was added with stirring to 45 ml of cyclohexane. The mixture was transferred to a centrifuge tube and centrifuged for 10 minutes at 7500 rpm (10,000 G). The supernatant was decanted off and the precipitate washed with 25 ml of fresh cyclohexane and dried in a vacuum oven at room temperature at 20" Hg vacuum and weighed. This residue was mostly lactide homopolymer; therefore, the test for grafting efficiency was a measure of initiation with polymerized HEA. Initiation by water, lactic acid, or unpolymerized HEA would produce homopolymer.

TABLE 2

Catalyst 0.02 mole % stannous chloride

| Polymer sample | Polymer Backbone | Weight % lactide by weight of graft copolymer | Grafting efficiency using SnCl$_2$.2H$_2$O | Melt viscosity at 177° C. (350° F.) mPas |
|---|---|---|---|---|
| A | BA | 35% | 82% | 23,000 |
| B | BA | 40% | 80% | 33,000 |
| C | BA | 25% | 82% | 7750 |
| D | BA | 25% | 82% | 7700 |
| E | BA/EHA | 30% | 87% | 9500 |

EXAMPLE 3

Graft Copolymers using 0.02 mole % stannous octoate

Polylactide graft copolymers were prepared as in Example 1 using 0.02 mole % stannous octoate based on lactide as the transesterification catalyst for the grafting of the lactide onto the polymer backbone. The backbone polymer compositions comprise 1 part by weight 2-HEA and 99 parts by weight BA or 1 part by weight 2-HEA and 99 parts by weight of equal weights of BA and 2-EHA. Table 3 gives the backbone composition, the weight percent of lactide added, the grafting efficiency, and the melt viscosity of the final graft copolymer. The data show that stannous chloride gives better grafting efficiencies than stannous octoate.

The graft copolymers prepared in Example 3 were strong, elastomeric materials similar to vulcanized rubber. Products containing equal amounts of BA and 2-EHA in the backbone were more flexible than the ones containing only BA.

TABLE 3

Catalyst 0.02 mole % stannous octoate

| Polymer sample | Polymer Backbone | Weight % lactide by weight of graft copolymer | Grafting efficiency using Sn(oct)$_2$ | Melt viscosity at 177° C. (350° F.) mPas |
|---|---|---|---|---|
| F | BA | 35% | 72% | 9700 |
| G | BA | 40% | 65% | 11,800 |
| H | BA | 40% | 72% | 11,900 |
| I | BN2-EHA | 35% | 73% | 11,000 |
| J | BN2-EHA | 40% | 71% | 12,200 |

In addition to the copolymers prepared in Examples 2 and 3, other graft copolymers containing 100% EHA were prepared, however, these polymerizations were heterogeneous, and grafting efficiencies were poor.

EXAMPLE 4

Variation in Percent Lactide

Various polyacrylate/polylactide graft copolymers were prepared according to Example 2 using 0.02 mole % SnCl$_2$·2H$_2$O based on lactide and a lactide polymerization temperature of 150° C. The polymer compositions in parts by weight of 2-HEA to a total of 100 parts, weight percent of lactide per backbone polymer, lactide grafting efficiencies, and melt viscosities are set out in Table 4. The data show that an important variable is the percent lactide, where small increases in lactide gave large increases in melt viscosity.

TABLE 4

Polyacrylate/Polylactide Graft Copolymers

| Composition of Polymer Backbone* | % Lactide** | Grafting efficiency | Melt Viscosity at 177° C. (350° F.) mPa.s |
|---|---|---|---|
| Monomer(s) 2-HEA | | | |
| BA 0.5 | 20% | 82% | 5,800 |
| BA 0.5 | 25% | 86% | 7,900 |
| BA 0.5 | 30% | 87% | 12,450 |
| BA 0.5 | 35% | 84% | 22,000 |
| BA 1.0 | 20% | 86% | 5,350 |
| BA 1.0 | 25% | 82% | 7,760 |
| BA 1.0 | 30% | 88% | 11,330 |
| BA 1.0 | 35% | 86% | 20,300 |
| BA/2-EHA equal parts 0.5 | 20% | 82% | 4,400 |
| BA/2-EHA equal parts 0.5 | 25% | 82% | 6,700 |
| BA/2-EHA equal parts 0.5 | 39% | 84% | 9,500 |
| BA/2-EHA equal parts 0.5 | 35% | 85% | 18,000 |
| BA/2-EHA equal parts 1.0 | 20% | 81% | 4,200 |
| BA/2-EHA equal parts 1.0 | 25% | 82% | 6,400 |
| BA/2-EHA equal parts 1.0 | 30% | 87% | 9,375 |
| BA/2-EHA equal parts 1.0 | 35% | 85% | 17,200 |
| BA/2-EHA ratio 75/25 1.0 | 20% | 84% | 4,500 |
| BA/2-EHA ratio 75/25 1.0 | 25% | 85% | 7,000 |
| EA*** 1.0 | 15% | 85% | 5,000 |

*Based on 100 parts by weight of total backbone polymer
**In weight percent, based on total weight of backbone polymer and lactide graft
***EA is ethyl acrylate; polymerization carried out in toluene.

EXAMPLE 5

Fluoride Salt as Stabilizer

A graft copolymer having a backbone prepared from butyl acrylate with 1% 2-HEA, and prepared from 12.5% by weight of L-lactide using 0.004 weight % of SnCl$_2$·2H$_2$O, was tested after preparation for stability over time with varying molar ratios of tetrabutylammonium fluoride to the SnCl$_2$·2H$_2$O. The results are given in Table 5 and show that extended stability can be obtained when the fluoride salt is added to the graft copolymer at a molar ratio of the fluoride salt to the tin of about 24:1 and greater.

TABLE 5

| Molar ratio (Bu)$_4$N$^+$F$^-$/ SnCl$_2$.H$_2$O | Viscosity over Time in mPas | | | |
|---|---|---|---|---|
| | 1 hour | 3 hours | 7 hours | 24 hours |
| 1 | 3750 | 4750 | 6000 | gellation |
| 6 | 4000 | 4500 | 5500 | gellation |
| 12 | 3750 | 5000 | 5500 | gellation |
| 15 | 4000 | 5000 | 5500 | gellation |
| 24 | 3500 | 3500 | 5000 | 15,000 |
| 30 | 3750 | 4000 | 4500 | 11,000 |

EXAMPLE 6

Adhesive Formulations and Performance

The polymers of Example 1 were formulated into adhesives and tested for performance according to the Peel and Shear Temperature tests described here:

Peel Temperature Test: A bead of test adhesive approximately one inch in diameter is applied at 163° C. to 177° C. (325° F. to 350° F.) with a glass rod onto 60 pound/ream Kraft paper. A second sheet of the same paper is superimposed on the first sheet within two seconds and pressed to the first sheet to form a Kraft-to-Kraft bond. The bonded sheets are then cut perpendicular to the adhesive line into one inch wide strips. Duplicate bonded specimens are placed in an oven with one free end of the specimen attached to a fixed support and a 100 gram load suspended from the other sheet in 180° peel mode. The oven temperature is then increased in 5.5° C. (10° F.) increments at 15 minute intervals. The temperature at which bond delamination occurred is specified as the peel temperature.

Shear Temperature Test: Samples are prepared as in the peel temperature test but separate sheets of Kraft at opposite ends of the bonded specimen are suspended and weighted to stress the bond in a shear mode. The temperature of the oven is increased as in the peel test until failure occurs.

Table 6 contains the compositions of various formulations of pressure sensitive, hot melt adhesives using the polymers of Examples 2 and 3, and the results of the Peel and Shear Temperature tests.

TABLE 6

Hot Melt Adhesive Compositions And Performance

| Adhesive Composition in weight percent | | | Viscosity at 177° C. | Ring and Ball Soft. Point | Adhesive failure Temperature ° C. (° F.) | |
|---|---|---|---|---|---|---|
| Polymer | Tackifier | Plasticizer | mPas | ° C. (° F.) | Peel | Shear |
| A 50% | Nirez 300 35% | Benzoflex 50 15% | 1,700* | 107 (225) | 43 (110) | 71 (160) |
| B 50% | Silvatac 100 NS 35% | Benzoflex 50 15% | 1,800* | 90.5 (195) | 43 (110) | 99 (210) |
| C 55% | Nirez 300 35% | Benzoflex 50 10% | 3,300 | 120 (248) | 38 (100) | 71 (160) |
| C 55% | Silvatac 100 NS 35% | Benzoflex 50 10% | 2,730 | 128 (262) | 60 (140) | 99 (210) |
| C 40% | Nirez 300 40% | Benzoflex 50 20% | 1,265 | 99 (210) | 43 (110) | 110 (230) |
| C 45% | Silvatac 100 NS 40% | Benzoflex 50 15% | 1,660 | 107 (225) | 49 (120) | 88 (190) |
| C 55% | Nirez 300 35% | Benzoflex 50 10% | 3,540 | 111 (232) | 38 (100) | 104 (220) |
| C 50% | Silvatac 100 NS 35% | Benzoflex 50 15% | 750 | 98 (209) | 38 (100) | 93 (200) |
| C 40% | Nirez V2040 40% | Santicizer 160 20% | 777 | 111 (233) | 38 (100) | 121 (250) |
| D 55% | Nirez 300 37.5% | Benzoflex 50 7.5% | 2,380 | 86 (187) | 38 (100) | 49 (120) |
| D 60% | Nirez 300 30% | Benzoflex 50 10% | 2,280 | 86 (186) | 54 (130) | 82 (180) |
| E 65% | Nirez 300 30% | Benzoflex 50 7.5% | 5,937 | 98 (208) | 43 (110) | 82 (180) |

*Temperature at 149° C. (300° F.).

Notes on Table

Nirez 300 is a terpene phenolic resin, a product of Arizona Chemical

Nirez V2040 is a terpene phenolic resin, a product of Arizona Chemical

Silvatac 100 NS is a mixture of pentaerythritol esters of tall oil rosin acids, a product of Arizona Chemical.

Benzoflex 50 is a 50/50 mixture of ethylene glycol dibenzoate and propylene glycol dibenzoate, a product of Velsicol Santicizer 160 is a benzyl butyl phthalate, a product of Monsanto.

The control for these samples was DURO-TAK adhesive, a product of National Starch and Chemical Company, Bridgewater, N.J., which gave values of 120° F. for Peel and 130° F. for Shear. The data show that the polylactide graft copolymers of this invention give comparable peel adhesion and superior shear adhesion to the commercially available standard. Moreover, the inventive adhesive formulations are partially biodegradable due to the polylactide portion of the graft copolymer.

The three samples using polymers D and E were tested for melt stability by measuring the viscosity after 72 hours at 177° C. (350° F.). Those viscosities were 1,252 mPa.s for D at 55% (in weight of composition), 1,212 mPa.s for D at 60%, and 3,755 mPa.s for E at 65%. These values indicate an acceptable decrease in viscosity over the accelerated time period of aging.

EXAMPLE 7

Rheological Dynamic Analysis

A common test for measuring the mechanical properties of the polymers is rheological dynamic analysis (RDA), which measures the in-phase and out-of-phase components of the stress developed in the polymer in response to a sinusoidal strain. In effect, RDA measures the deformation and flow of materials in terms of elasticity and viscosity stress. The ratio of elastic stress to shear strain is the elastic (storage) modulus G', which is a measure of the energy stored in elastic deformation. The higher the G' values, the stiffer the material. The ratio of the viscous stress to shear strain is the loss modulus G", which is associated with viscous energy dissipation. The ratio of the viscous modulus to the elastic modulus (G"/G'=tan δ) is the loss tangent, which also measures the damping ability of the material.

RDA is also a very sensitive method for measuring the glass transition temperature of a polymer. The glass transition is a reversible change of the polymer between rubbery and glassy states and occurs at a specific short span of temperature. The glass transition is detected as a considerable and sudden change in the elastic modulus and an attendant peak in the tan δ curve.

FIGS. 1 to 4 show the RDA plots of selected butyl acrylate/lactide graft copolymers. Temperature in degrees Celcius is plotted on the X-axis, and G' (dyne/cm$^2$) and tan δ are plotted on the Y-axis.

Figure 2:
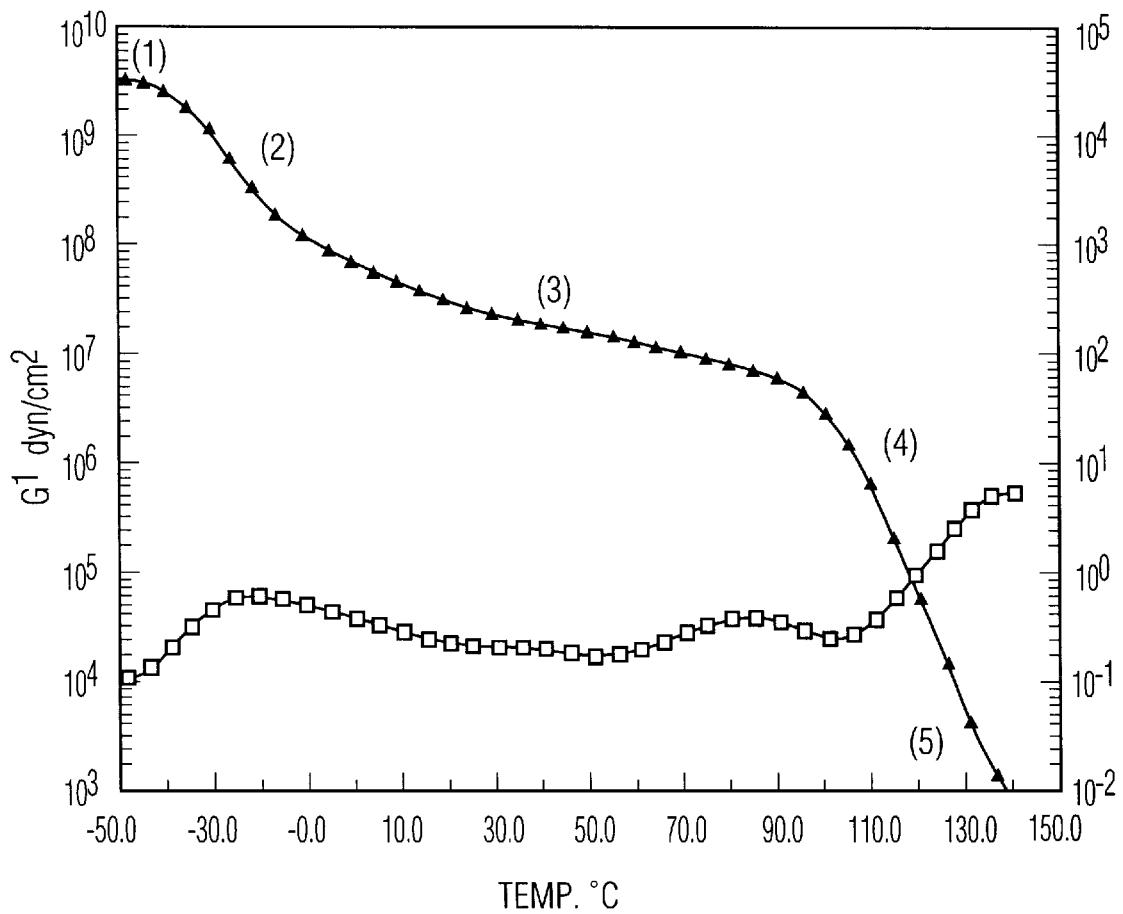
Figure 3:
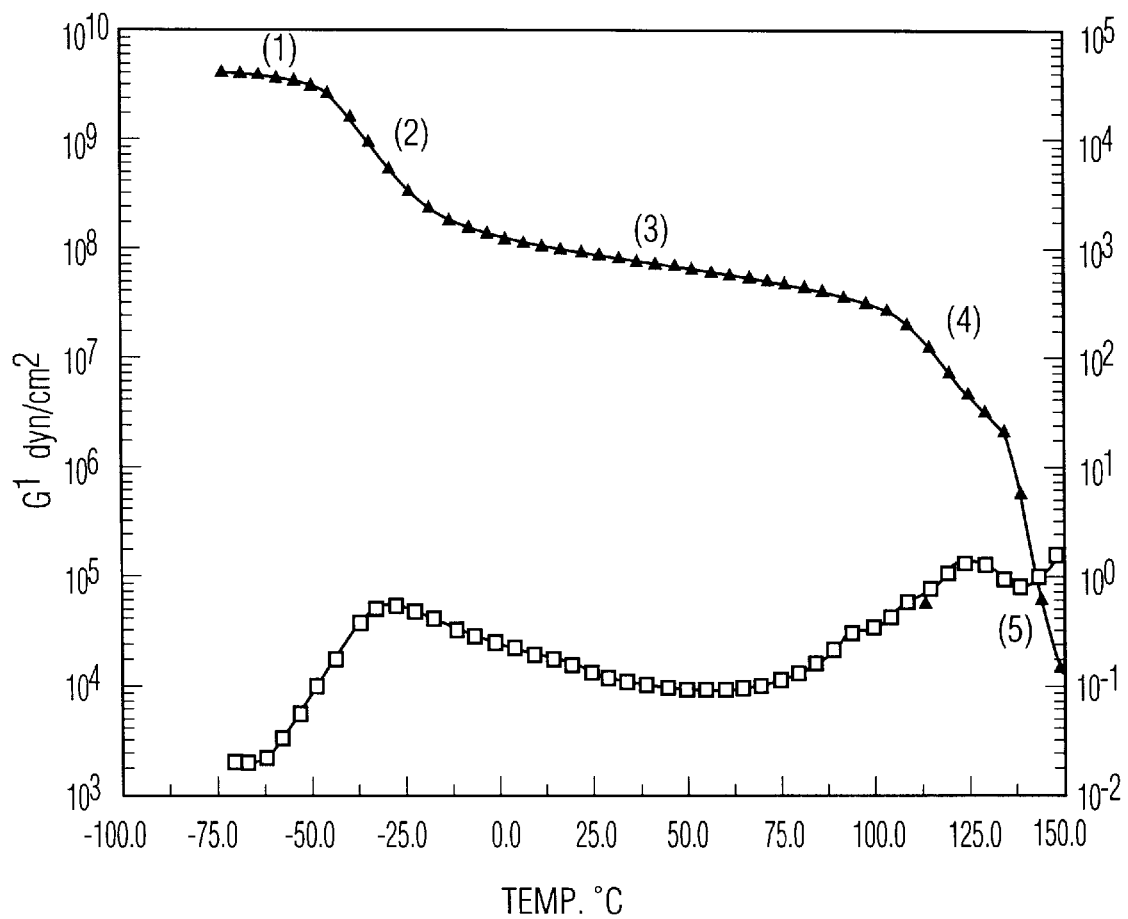
Figure 4:
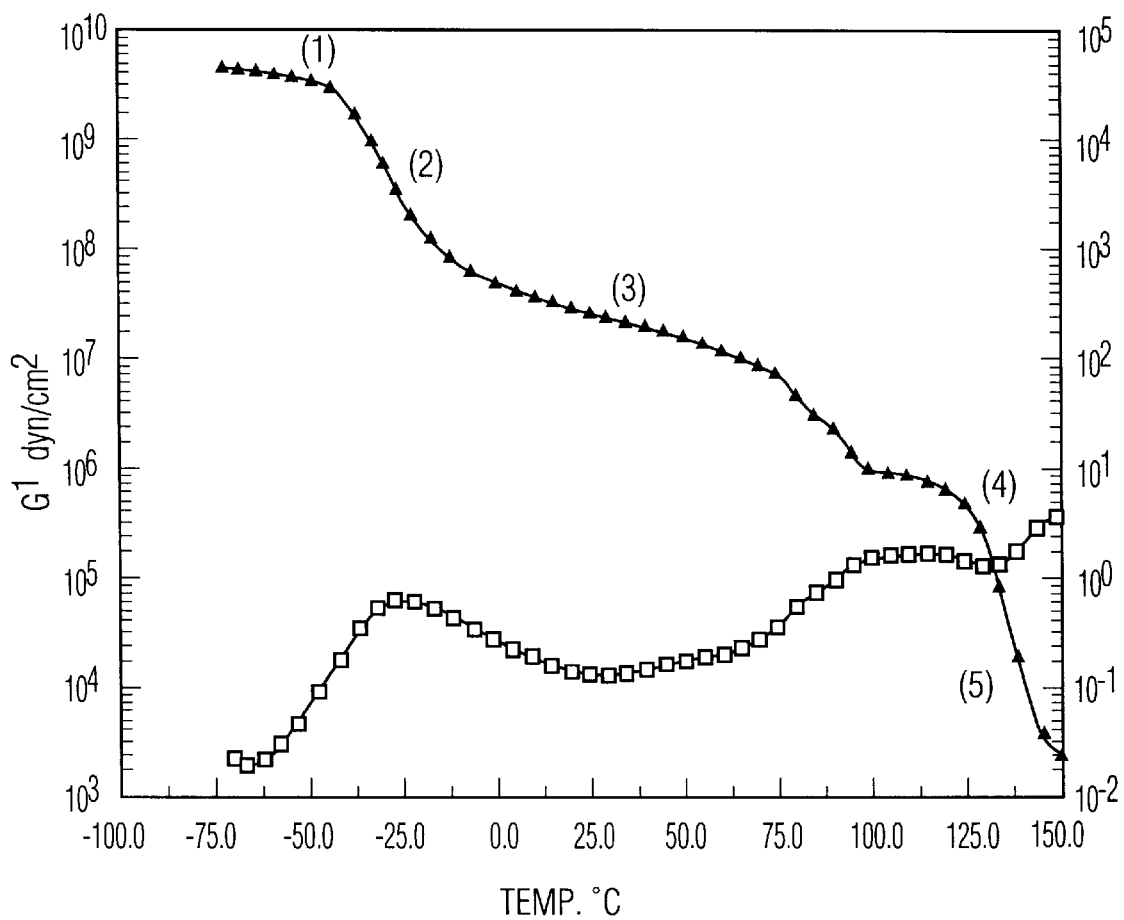

Each graft copolymer has a backbone prepared from butyl acrylate with varying amounts by weight of 2-hydroxyethyl acrylate (2-HEA), and lactide grafts polymerized onto the backbone from varying amounts of lactide given in weight percent by weight of the polymer backbone. FIG. 1 is a graph of the RDA of a copolymer prepared from 0.5% by weight of 2-HEA, and 25% by weight of lactide. FIG. 2 is a graph of the RDA of a copolymer prepared from 0.5% by weight of 2-HEA, and 35% by weight of lactide. FIG. 3 is a graph of the RDA of a copolymer prepared from 1.0% by weight of 2-HEA, and 35% by weight of lactide. FIG. 4 is a graph of the RDA of a copolymer prepared from 1.0% by weight of 2-HEA, and 40% by weight of lactide.

Five regions of viscoelasticity can be identified on the plots and are numbered as follows: (1) region where the polymers are glassy; (2) the glass transition (Tg) region; (3) region where the polymers are amorphous, but still contain crystalline domains and exhibit elastomeric behavior; (4) region where the crystalline domains melt; (5) region where the crystalline domains have melted and the polymer flows.

Region (3) is the rubbery modulus plateau where the polymers exhibit the desired elastomeric adhesive properties. The broader this modulus plateau, the broader the temperature range of performance for the polymer.

The region (3) plateau modulus varies with composition and increases with a decrease in 2-HEA content, increase in lactide content, and increase in grafting efficiency. As seen from the plots, a wide plateau region, corresponding to a wide temperature range over which the adhesives can be used, is obtained at 35% and 40% lactide. A useful region can also be obtained with a somewhat lower amount of lactide when the 2-H EA content is decreased from 1.0% to 0.5%. In this case, there are fewer grafting sites on the polymer, causing the lactide to form longer chains. The longer lactide chains raise the melt temperature and consequently increase the temperature range over which adhesives incorporating these polymers can be used.

We claim:

1. A hot melt adhesive composition comprising a) 20–100 wt. % of a graft copolymer, characterized as a thermoplastic elastomeric polymer, having the structure

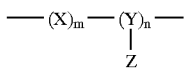

in which
X represents the polymer units resulting from the polymerization of one or more unsubstituted monomers (the X monomers) selected from the group consisting of $C_2$–$C_8$ alkyl acrylate, $C_2$–$C_8$ alkyl methacrylate, ethylene and vinyl acetate;
Y represents the polymer units resulting from the polymerization with the X monomers of a monomer (the Y monomers) selected from the group consisting of 2-hydroxyethyl acrylate, 2-hydroxyethyl methacrylate, hydroxypropyl acrylate, hydroxypropyl methacrylate, allyl alcohol, and N-(t-butyl)aminoethyl methacrylate, the Y monomers present in an amount up to about 6%, but not 0%, by weight of the X monomers;
Z represents the polymer units resulting from the polymerization of lactide or glycolide, in which the total amount of the lactide or glycolide is present in an amount up to about 40%, but not 0%, by weight of the total polymer weight; and
m and n are integers designating the relative molar amounts of monomer units comprising the backbone chain of the polymer such that the backbone polymer has a number average molecular weight of 10,000–200,000;
b) 0–80 wt. % tackifier;
c) 0–50 wt. % plasticizer;
d) 0–3 wt. % stabilizer;
e) 0–30 wt. % wax.

2. The hot melt adhesive composition according to claim 1 in which Z represents the polymer units resulting from the polymerization of lactide.

3. The hot melt adhesive composition according to claim 1 in which the X monomers are butyl acrylate, or
a mixture of butyl acrylate and one or more $C_2$–$C_8$ alkyl acrylates other than butyl acrylate.

4. The hot melt adhesive according to claim 3 in which the butyl acrylate is present in an amount of at least 50% by weight of the mixture of butyl acrylate and one or more $C_2$–$C_8$ alkyl acrylates other than butyl acrylate.

5. The hot melt adhesive composition according to claim 3 in which the $C_2$–$C_8$ acrylate is 2-ethylhexyl acrylate.

* * * * *